US011048987B2

(12) United States Patent
Yamamoto (10) Patent No.: US 11,048,987 B2
(45) Date of Patent: Jun. 29, 2021

(54) IMAGE FORMING APPARATUS WITH AN IMPROVED CENTERING IMAGE PRINTING CAPABILITY (71) Applicant: KYOCERA Document Solutions Inc., Osaka (JP)

(72) Inventor: Takenori Yamamoto, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 16/746,353

(22) Filed: Jan. 17, 2020

(65) Prior Publication Data
US 2020/0242427 A1 Jul. 30, 2020

(30) Foreign Application Priority Data
Jan. 25, 2019 (JP) .............................. JP2019-011455

(51) Int. Cl.
*G06K 5/04* (2006.01)
*G06K 15/02* (2006.01)

(52) U.S. Cl.
CPC .................................. *G06K 15/027* (2013.01)

(58) Field of Classification Search
CPC ....... G06K 15/027; G06K 9/32; G06F 3/1242
USPC ...................... 358/1.15, 2.1, 3.24, 1.12, 1.18
See application file for complete search history.

(56) References Cited

U.S. PATENT DOCUMENTS

| 6,118,950 | A | * | 9/2000 | Wibbels | G03G 15/231 |
| | | | | | 399/16 |
| 9,042,794 | B1 | * | 5/2015 | Hill | G03G 15/168 |
| | | | | | 399/313 |
| 2010/0329756 | A1 | * | 12/2010 | Mizes | G03G 15/6517 |
| | | | | | 399/364 |

FOREIGN PATENT DOCUMENTS

| JP | H05-313447 | 11/1993 |
| JP | 2003-262990 | 9/2003 |
| JP | 2014-139110 | 7/2014 |

* cited by examiner

Primary Examiner — Jamares Q Washington (57) ABSTRACT

A control unit determines as a sheet center actual position a center position of a print sheet, and adjusts a center position of the image to be printed on the basis of a difference from the sheet center actual position. Further, the control unit prints a main scale image along a primary scanning direction on one face of a print sheet for a test chart, prints a vernier scale image along the primary scanning direction on the other face of the print sheet, determines a deviation between a reference center position of the print engine and a reference center position of the line sensor on the basis of a scale mark of the main scale image that agrees with a scale mark of the vernier scale image, and moves a center position of the image to be printed so as to reduce the determined deviation.

3 Claims, 11 Drawing Sheets

FIG. 8A   WHEN THE SCALE MARKS ARE AGREED OF NUMERICAL VALUE ZERO

FIG. 8B   WHEN THE SCALE MARKS ARE AGREED OF NUMERICAL VALUE +2

FIG. 8C   WHEN THE SCALE MARKS ARE AGREED OF NUMERICAL VALUE -5

IMAGE FORMING APPARATUS WITH AN IMPROVED CENTERING IMAGE PRINTING CAPABILITY

CROSS-REFERENCE TO RELATED APPLICATIONS

This application relates to and claims priority rights from Japanese Patent Application No. 2019-011455, filed on Jan. 25, 2019, the entire disclosures of which are hereby incorporated by reference herein.

BACKGROUND

1. Field of the Present Disclosure

The present disclosure relates to an image forming apparatus.

2. Description of the Related Art

An image forming apparatus (hereinafter, called "first image forming apparatus") detects a center of a print sheet using a line sensor, determines a deviation between the center of the print sheet and a center of an image to be printed to the print sheet, and moves a transportation roller along a width direction of the print sheet while the transportation roller nips the print sheet and thereby reduces the deviation.

An image forming apparatus (hereinafter, called "second image forming apparatus") includes plural sheet feeding trays, memorizes fixed center position deviation amounts corresponding to the plural sheet feeding trays, and mechanically adjusts an optical system for an electrophotographic process and thereby moves an image to be formed in an electrophotographic process by the center position deviation amount corresponding to the sheet feeding tray in use.

Further, an image forming apparatus (hereinafter, called "third image forming apparatus") (a) prints a main scale image on a front face of a paper sheet and a vernier scale image on a back face of the paper sheet along a secondary scanning direction in order to make a position of an image on the front face and a position of an image on the back face coincident with each other, (b) prompts a user to input a coincident position of scale marks of the main scale image and the vernier scale image, and (c) restrains a deviation between positions of the images on the front and back faces on the basis of the inputted position.

The first image forming apparatus can reduce a deviation of the center position on the basis of a center position of a print sheet in transportation, but requires a mechanism to mechanically move the transportation roller and consequently results in a high cost of the apparatus.

Further, the second image forming apparatus mechanically corrects a center position of an image to be formed in an electrophotographic process on the basis of the fixed center position deviation amount, and consequently results in a high cost of the apparatus as well, and in addition, it does not effectively reduce a deviation of the center position because it does not take fluctuation of the center position sheet by sheet into account.

Furthermore, the third image forming apparatus aims for restraining a deviation between positions of images on the front and back faces, and therefore, hardly reduces a deviation between a center position of a print sheet and a center position of an image to be formed on the print sheet.

SUMMARY

An image forming apparatus according to an aspect of the present disclosure includes a print engine, a sheet transportation unit, a line sensor, and a control unit. The print engine is configured to physically print an image to be printed on a print sheet. The sheet transportation unit is configured to transport the print sheet. The line sensor is arranged along a direction perpendicular to a transportation direction of the print sheet, and configured to detect positions of both end edges of the print sheet. The control unit is configured to (a) determine as a sheet center actual position a center position of the print sheet on the basis of the detected positions of both end edges of the print sheet, and (b) adjust a center position of the image to be printed on the basis of a difference from the sheet center actual position. Further, the control unit (a) prints a main scale image along a primary scanning direction on one face among a front face and a back face of a print sheet for a test chart using the print engine, (b) prints a vernier scale image along the primary scanning direction on the other face among the front face and the back face of the print sheet for the test chart using the print engine, (c) determines a deviation between a reference center position of the print engine and a reference center position of the line sensor on the basis of a scale mark of the main scale image that agrees with a scale mark of the vernier scale image, and (d) moves a center position of the image to be printed so as to reduce the determined deviation.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
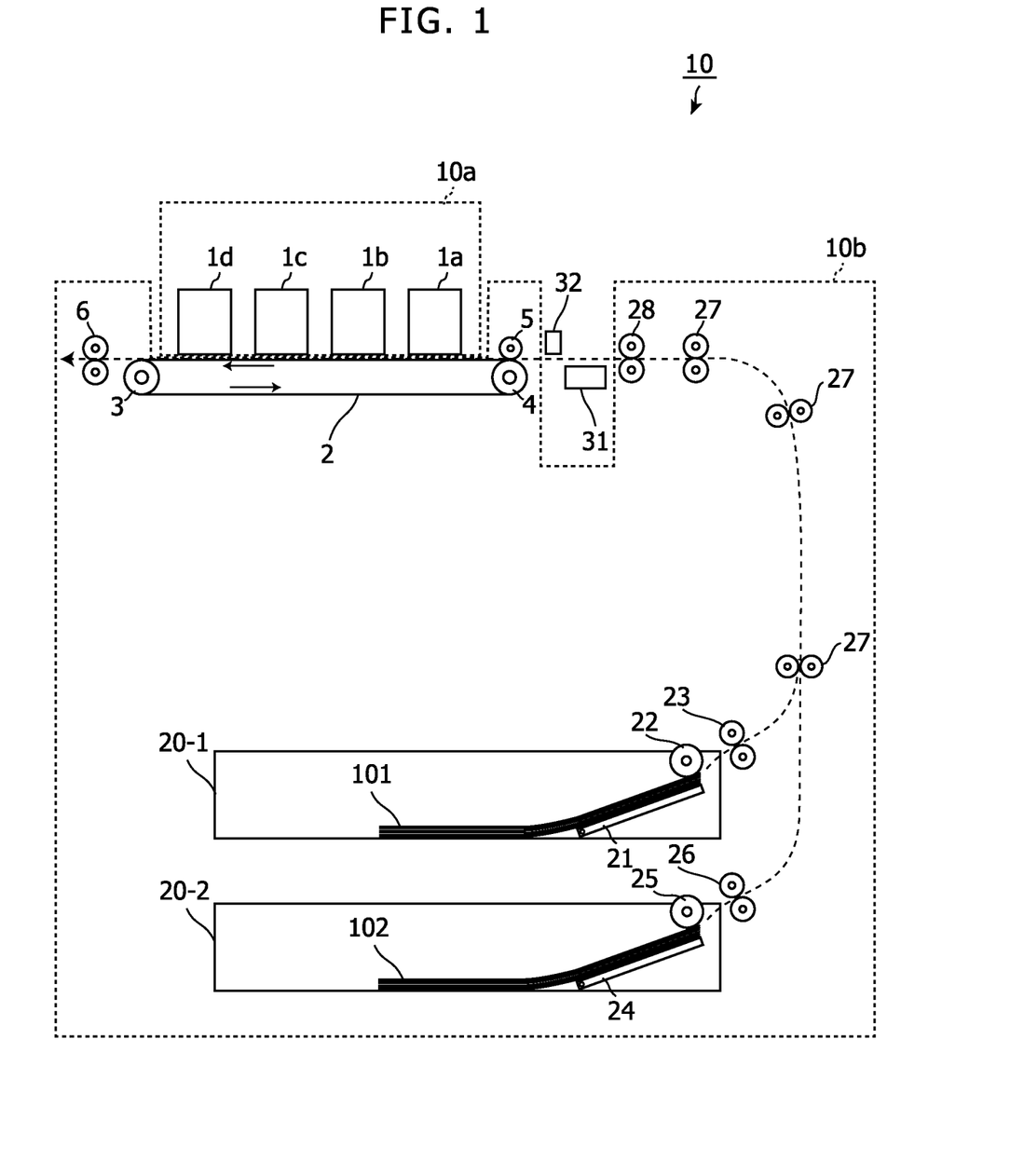
FIG. 1 shows a side view that indicates an internal mechanical configuration of an image forming apparatus in an embodiment according to the present disclosure.
Figure 2:
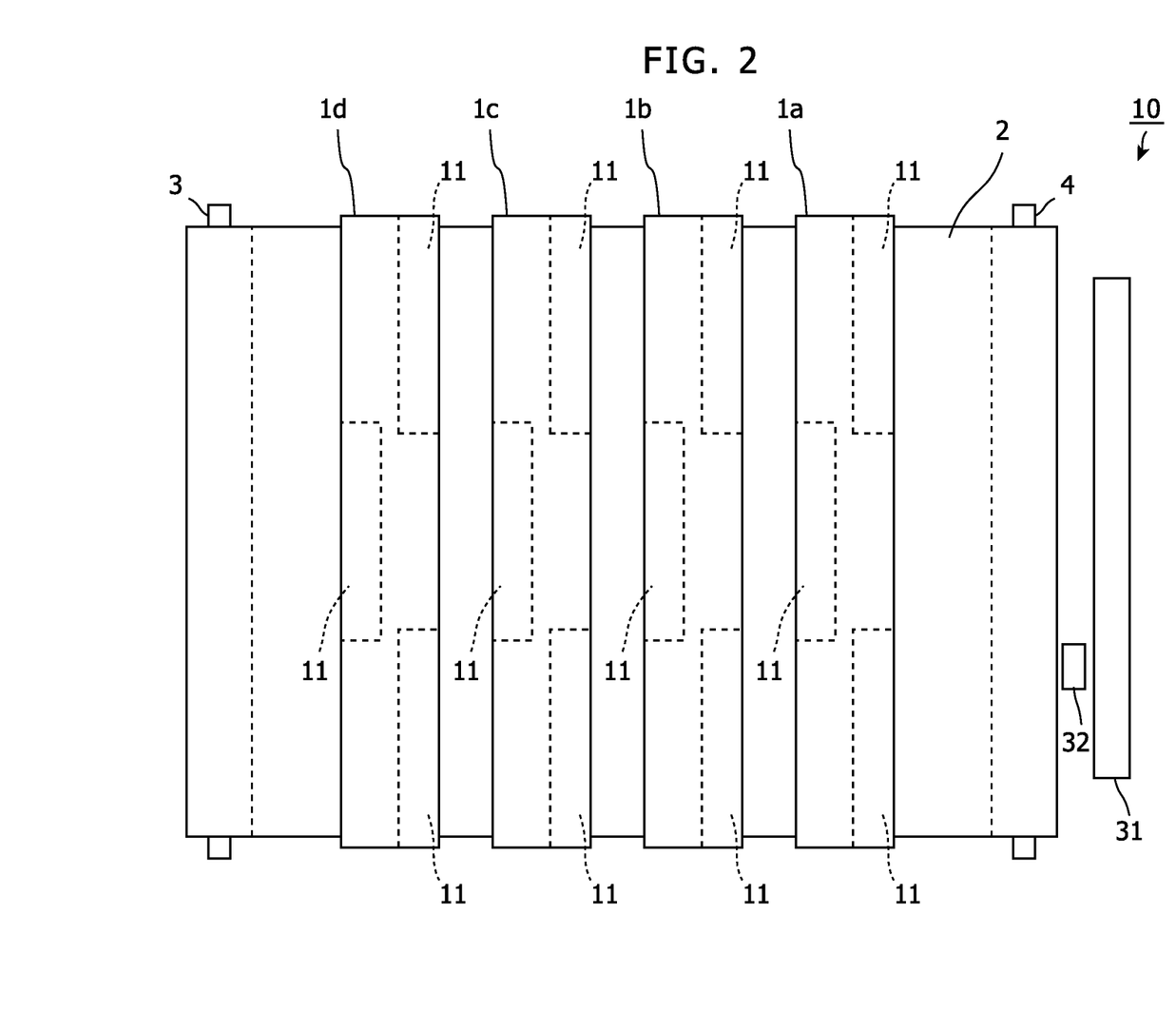
FIG. 2 shows a plane view of the image forming apparatus shown in FIG. 1.

FIG. 1 shows a side view that indicates an internal mechanical configuration of an image forming apparatus in an embodiment according to the present disclosure. FIG. 2 shows a plane view of the image forming apparatus shown in FIG. 1.

The image forming apparatus 10 in this embodiment is an apparatus such as printer, copier, facsimile machine or multi function peripheral, and has an inkjet color printing mechanism of a line type in this embodiment.

The image forming apparatus 10 includes a print engine 10a and a sheet transportation unit 10b. The print engine 10a physically prints an image to be printed on a print sheet (print paper sheet or the like). The sheet transportation unit 10b transports the print sheet to the print engine 10a.

In this embodiment, the print engine 10a includes line-type inkjet recording units 1a to 1d corresponding to four ink colors: Cyan, Magenta, Yellow, and Black.

As shown in FIG. 2, in this embodiment, each inkjet recording unit 1a, 1b, 1c or 1d includes plural (here, three) head units 11. The head units 11 are arranged along a primary scanning direction, and are capable of being mounted to and demounted from a main body of the image forming apparatus. Each inkjet recording unit 1a, 1b, 1c or 1d may include only one head unit 11.

Further, in this embodiment, the sheet transportation unit 10b includes (a) a circular-type transportation belt 2, arranged so as to face the print engine 10a, that transports a print sheet, (c) a driving roller 3 and a driven roller 4 around which the transportation belt 2 is hitched, (d) a nipping roller 5 that nips the print sheet with the transportation belt 2, and (e) an output roller pair 6.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units 1a to 1d in turn, and on the print sheet, images of respective colors are printed by the inkjet recording units 1a to 1d. Subsequently, after the color printing, the print sheet is outputted by the output roller pair 6 to an output tray (not shown) or the like.

Further, the sheet transportation unit 10b includes plural sheet feeding cassettes 20-1 and 20-2. The sheet feeding cassettes 20-1 and 20-2 store print sheets 101 and 102, and push up the print sheets 101 and 102 using lift plates 21 and 24 so as to cause the print sheets 101 and 102 to contact with pickup rollers 22 and 25, respectively. The print sheets 101 and 102 put on the sheet feeding cassettes 20-1 and 20-2 are picked up to sheet feeding rollers 23 and 26 by the pickup rollers 22 and 25 sheet by sheet from the upper side, respectively. The sheet feeding rollers 23 and 26 are rollers that transport the print sheets 101 and 102 sheet by sheet fed by the pickup rollers 22 and 25 from the sheet feeding cassettes 20-1 and 20-2 onto a transportation path.

A transportation roller 27 is a transportation roller on the transportation path common to the print sheets 101 and 102 transported from the sheet feeding cassettes 20-1 and 20-2.

The registration roller 28 temporarily stops the incoming print sheet 101 or 102 in transportation, and transports this print sheet 101 or 102 to the print engine 10a at a secondary sheet feeding timing. The secondary sheet feeding timing is instructed by a control unit 51 mentioned below such that an image is formed at a specified position on the print sheet 101 or 102.

In this embodiment, when the print sheet 101 or 102 reaches the registration roller 28, the transportation roller 27 previous to the registration roller 28 adjusts a transportation time length of the print sheet 101 or 102 and thereby creates flexure of the print sheet 101 or 102, and consequently restrains skew (i.e. oblique motion) of the print sheet 101 or 102.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges of the print sheet. For example, the line sensor 31 is a CIS (Contact Image Sensor). In this embodiment, the line sensor 31 is arranged at a position on the transportation path of the print sheet between the registration roller 28 and the print engine 10a.

The sheet detecting sensor 32 is an optical sensor that detects that a top end of the print sheet 101 or 102 passes through a predetermined position on the transportation path.

Figure 3:
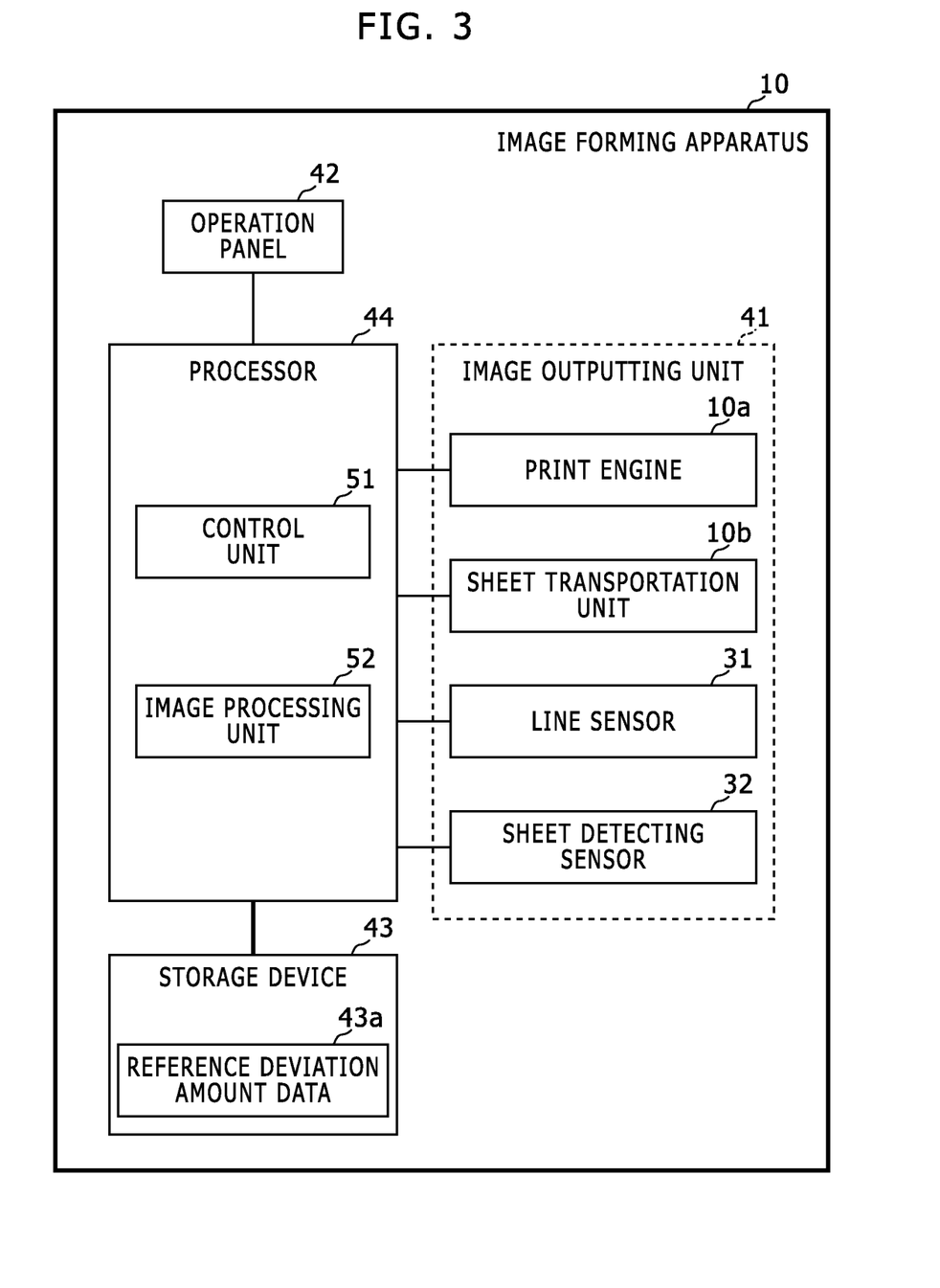
FIG. 3 shows a block diagram that indicates an electronic configuration of the image forming apparatus 10 in the embodiment according to the present disclosure.

FIG. 3 shows a block diagram that indicates an electronic configuration of the image forming apparatus 10 in the embodiment according to the present disclosure.

As shown in FIG. 3, the image forming apparatus 10 includes not only an image outputting unit 41 that includes the mechanical configuration shown in FIGS. 1 and 2 but an operation panel 42, a processor 43, and a processor 44. The image outputting unit 41 includes the aforementioned line sensor 31 and the aforementioned sheet detecting sensor 32.

The operation panel 42 is arranged on a housing surface of the image forming apparatus 10, and includes a display device such as a liquid crystal display and an input device such as a hard key and/or touch panel, and displays sorts of messages for a user using the display device and receives a user operation using the input device.

The storage device 43 is a non-volatile storage device (flash memory, hard disk drive or the like) in which data, a program and the like have been stored and are required for control of the image forming apparatus 10. In the storage device 43, reference deviation amount data 73a mentioned below has been stored.

The processor 44 includes a computer that acts in accordance with a program, an ASIC (Application Specific Integrated Circuit) that performs a predetermined action, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 43, the ROM or the like to the RAM and executes the program using the CPU and thereby acts as processing units (with the ASIC if required).

Here the processor 44 acts as a control unit 51 and an image processing unit 52.

The control unit 51 controls the image outputting unit 41 and thereby performs a print job requested by a user. In this embodiment, the control unit 51 causes the image processing unit 52 to perform a predetermined image process, and controls the head units 11 and causes the head units 11 to eject ink and thereby forms a printing image on a print sheet. The image processing unit 52 performs a predetermined image process such as RIP (Raster Image Processing), color conversion, halftoning and/or the like for image data of a printing image.

In particular, the control unit 51 has an automatic centering function that (a) determines as a sheet center actual position a center position of a print sheet on the basis of the positions of both end edges of the print sheet detected by the line sensor 31, and (b) adjusts a center position of an image to be printed, on the basis of a difference from the sheet center actual position.

Therefore, the control unit 51 causes the print engine 10a to perform printing of the image so as to move the image in a primary scanning direction by a difference between a reference center position of the print engine 10a and the sheet center actual position.

In this embodiment, the control unit 51 determines the center position of the print sheet 101 or 102 (i.e. the sheet center actual position) on the basis of positions of the both end edges detected by the line sensor 31 at a time point that a top end of the print sheet in transportation is detected by the sheet detecting sensor 32. Consequently, the sheet center actual position is measured at a constant position in the print sheet 101 or 102. Therefore, even if plural print sheets 101 or 102 in series are obliquely transported, the sheet center actual positions of the plural print sheets 101 or 102 are measured in the same condition.

Further, the aforementioned reference deviation amount data 43a indicates a deviation amount (hereinafter, called "reference deviation amount") between a reference center position of the print engine 10a (i.e. a center position of a print area in the primary scanning direction, namely, a center position of a printed image without positional correction) and a reference center position of the line sensor 31.

Figure 4:
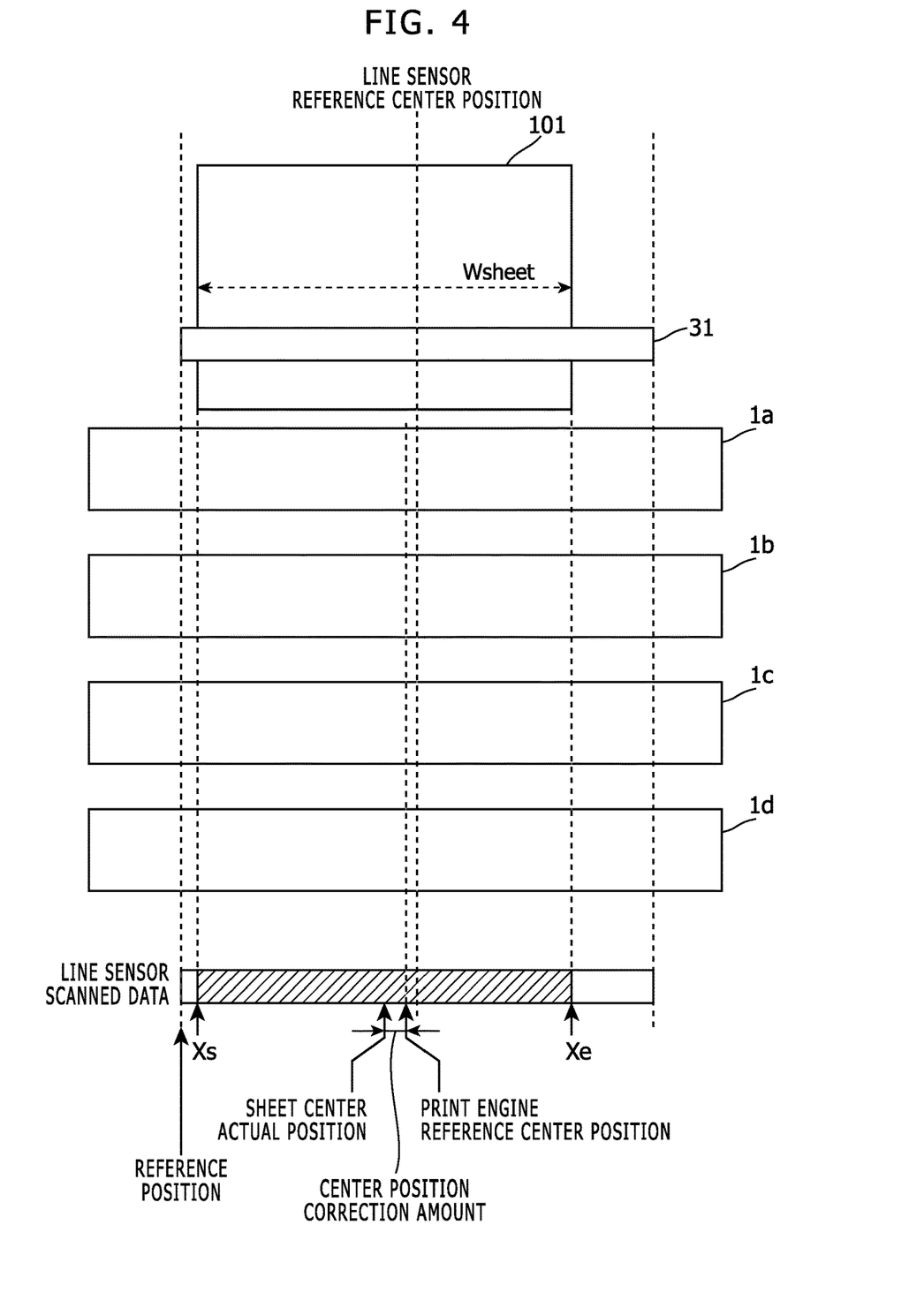
FIG. 4 shows a diagram that explains a correction amount of a center position of an image in the image forming apparatus 10 in Embodiment 1.

FIG. 4 shows a diagram that explains a correction amount of a center position of an image in the image forming apparatus 10 in Embodiment 1.

As shown in FIG. 4, in scanned data of the line sensor 31, pixels in a section (from a pixel position Xs to a pixel position Xe) of a width Wsheet of the print sheet 101 or 102 have pixel values corresponding to a color of the print sheet 101 or 102, and the other pixels have pixel values corresponding to a background color, and therefore, edges appear in an image at pixel positions Xs and Xe corresponding to (physical) both end edges of the print sheet 101 or 102. The control unit 51 detects these edges in an image detected by the line sensor, and derives a sheet center actual position P1 in accordance with the following formula. It should be noted that a pixel position of a pixel is expressed as a number of pixels from a reference position to this pixel, where the reference position is set as an end of the line sensor 31.

$$P1=(Xe-Xs)/2$$

Further, a correction amount dx of a center position of an image to be printed is expressed as the following formula based on the sheet center actual position P1, the reference center position Pp_ref of the print engine 10a (specifically, the inkjet recording units 1a, 1b, 1c, and 1d), and the reference center position Ps_ref of the line sensor 31.

$$dx=(P1-Ps\_ref)+(Ps\_ref-Pp\_ref)$$

Here, (P1−Ps_ref) is a deviation amount of the sheet center actual position P1 from the reference center position Ps_ref of the line sensor 31, and is detected of every print sheet.

Further, (Ps_ref−Pp_ref) is a deviation amount (i.e. the aforementioned reference deviation amount) between the reference center position Ps_ref of the line sensor 31 and the reference center position Pp_ref of the print engine 10a, and is specified by the reference deviation amount data 43a. This deviation amount in the reference deviation amount data 43a is renewed in an adjustment action using the test chart.

Figure 5:
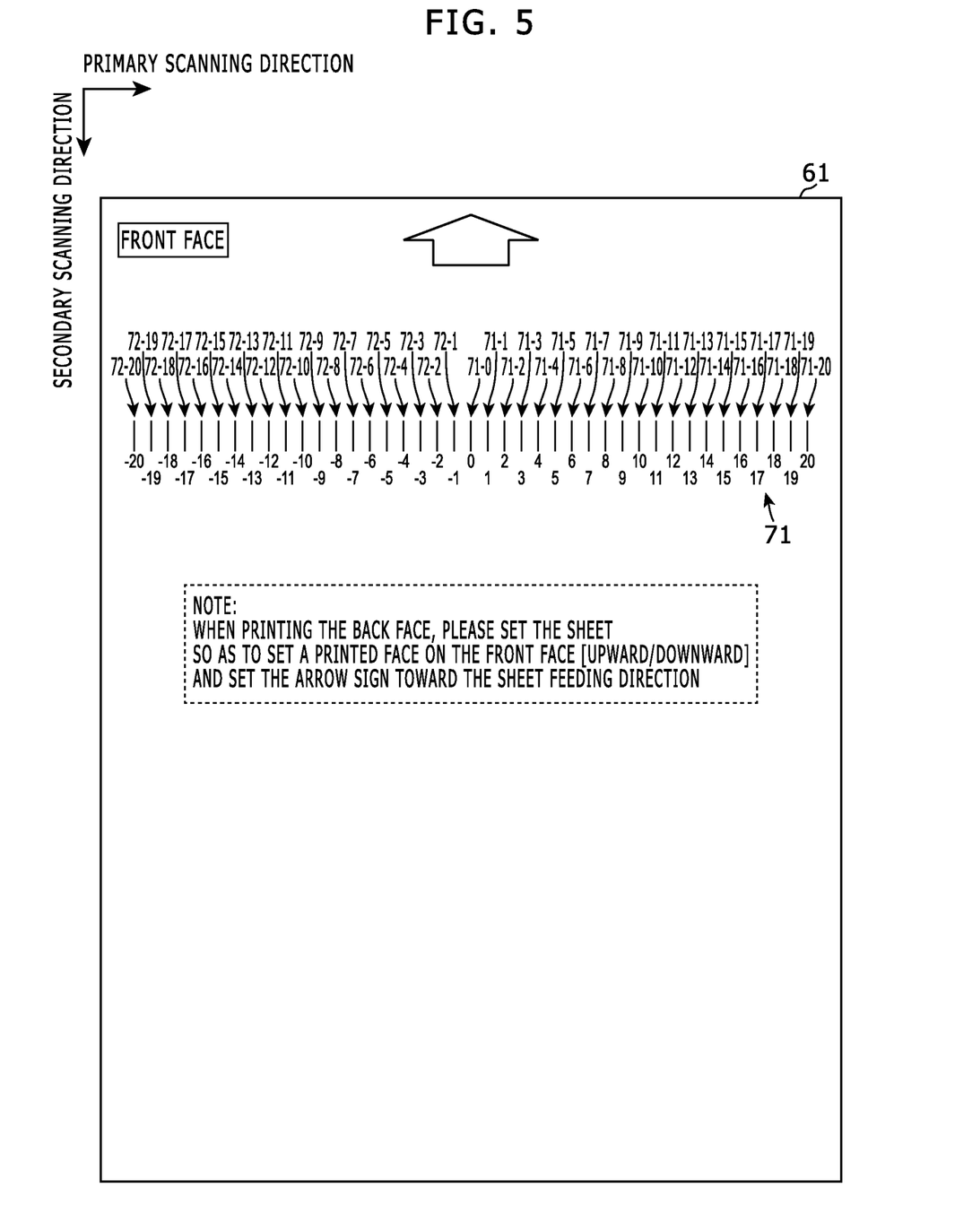
FIG. 5 shows a diagram that indicates an example of a front face of a test chart.
Figure 6:
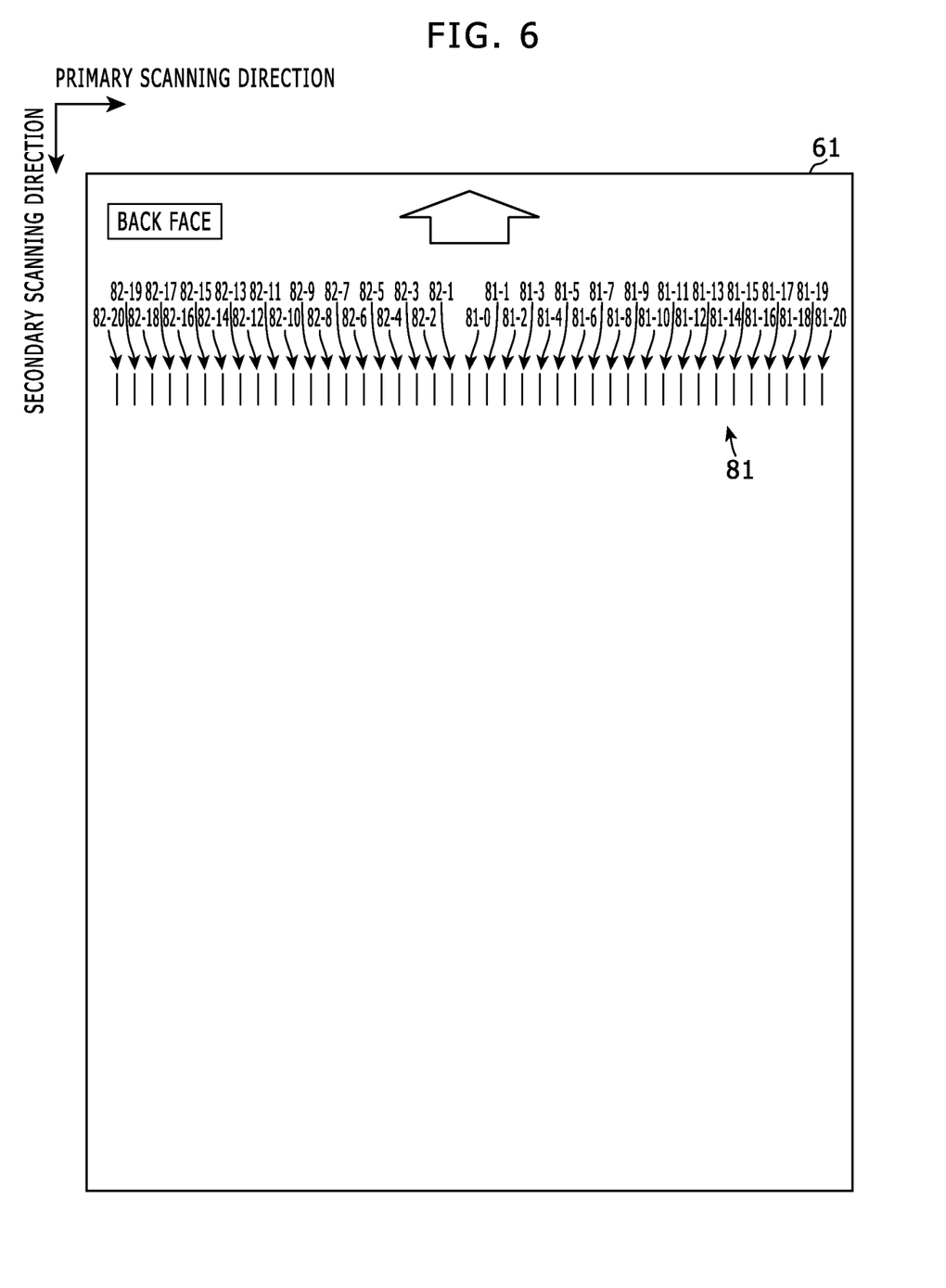
FIG. 6 shows a diagram that indicates an example of a back face of the test chart.
Figure 7:
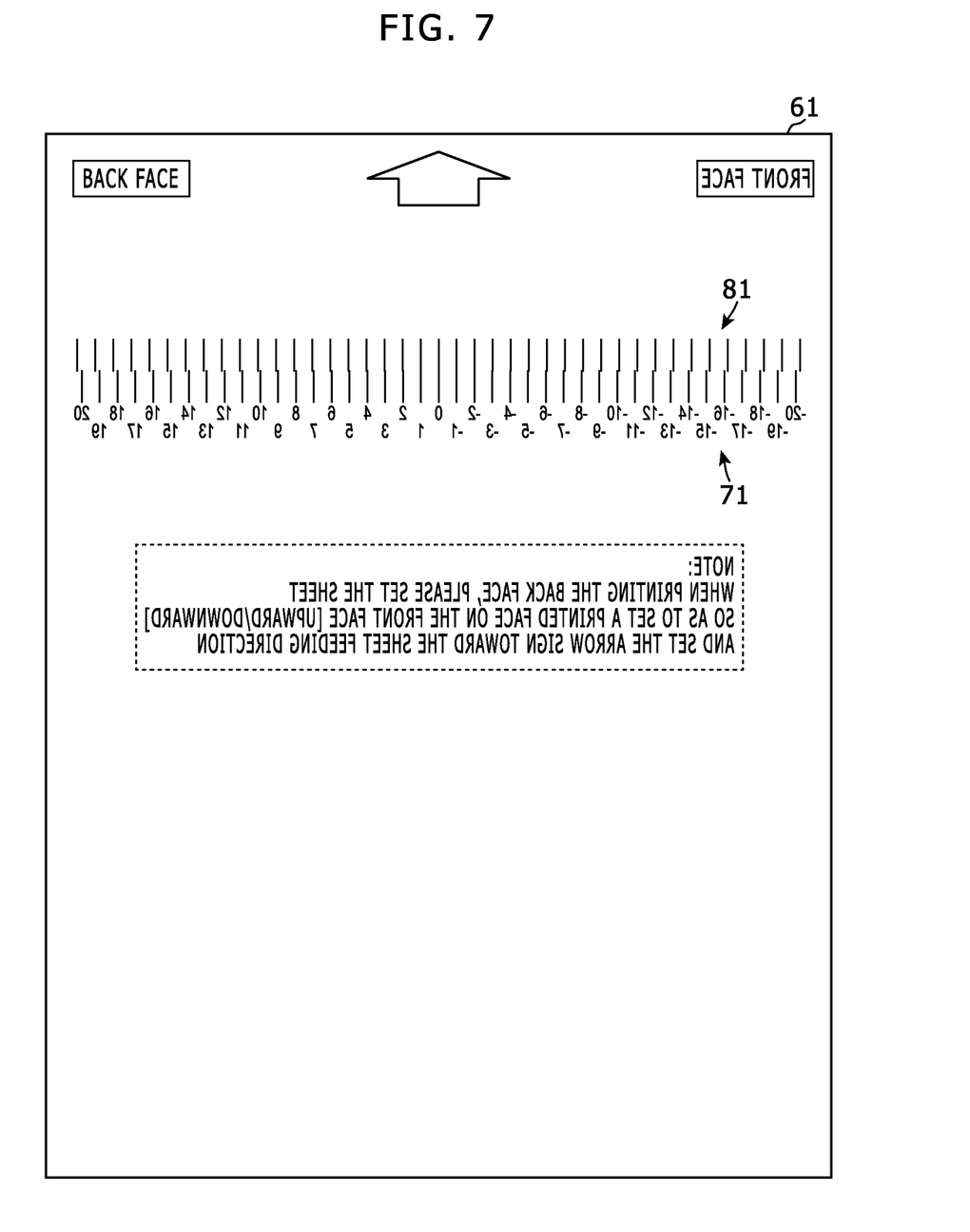
FIG. 7 shows a transparent view of the test chart shown in FIGS. 5 and 6.

FIG. 5 shows a diagram that indicates an example of a front face of a test chart, FIG. 6 shows a diagram that indicates an example of a back face of the test chart, and FIG. 7 shows a transparent view of the test chart shown in FIGS. 5 and 6.

Specifically, the control unit 51 (a) prints a main scale image 71 along a primary scanning direction on one face (here, a front face) among a front face and a back face of a print sheet for a test chart 61 using the print engine 10a, as shown in FIG. 5, for example, (b) prints a vernier scale image 81 along the primary scanning direction on the other face (here a back face) among the front face and the back face of the print sheet for the test chart 61 using the print engine, as shown in FIG. 6, for example, (c) as shown in FIG. 7, for example, determines a deviation between a reference center position of the print engine 10a and a reference center position of the line sensor 31 on the basis of a scale mark (e.g. a scale mark of zero in the test chart 61 shown in FIG. 7) of the main scale image 71 that agrees with a scale mark of the vernier scale image 81, and (d) moves a center position of the image to be printed so as to reduce the determined deviation.

Here, the main scale image 71 has plural scale marks 71-0 to 71-20 and 72-1 to 72-20 with an interval that is a predetermined first number M1 of pixels, and has numerical numbers attached to the plural scale marks 71-0 to 71-20 and 72-1 to 72-20, respectively; and the vernier scale image 81 plural scale marks 81-0 to 81-20 and 82-1 to 82-20 with an interval that is a predetermined first number M2 of pixels such that the number M2 is different from the number M1. The interval of the scale marks of the main scale image 71 (i.e. the first number of pixels M1) is set as (M*2) on the basis of the maximum tolerance M of the deviation between the reference center position of the print engine 10a and the reference center position of the line sensor 31, and the number of scale marks of the main scale image 71 and the number of scale marks of the vernier scale image 81 are set as (M*2) on the basis of the maximum tolerance M, respectively.

For example, the main scale image 71 has 20 scale marks with an interval of 20 pixels, and the vernier scale image 81 has 20 scale marks with an interval of 21 pixels. The aforementioned deviation is detected with a precision corresponding to a difference dM between the first and second numbers of pixels M1 and M2 (=M2−M1, here dM=1).

As shown in FIG. 6, the main scale image 71 has the scale mark 71-0 for zero, the scale marks 71-1 to 71-20 for positive numerical values, and the scale marks 72-1 to 72-20 for negative numerical values; and a numerical value "0" is attached to the scale mark 71-0, positive numerical numbers increasing 1 by 1 are attached to the positive scale marks 71-1 to 71-20, and negative numerical numbers decreasing 1 by 1 are attached to the negative scale marks 72-1 to 72-20. Further, as shown in FIG. 7, the vernier scale image 81 has the scale mark 81-0 for zero, the scale marks 81-1 to 81-20 for positive numerical values, and the scale marks 82-1 to 82-20 for negative numerical values, correspondingly to the scale mark 71-0 for zero, the positive scale marks 71-1 to 71-20, and the negative scale marks 72-1 to 72-20.

Assuming the aforementioned numerical value as Num, the control unit 51 calculates (dM*Num/2) as the aforementioned deviation (number of pixels). In this embodiment, this numerical value Num is visually determined and inputted to the operation panel 42 by a user. Specifically, the user sees the vernier scale image 81 transparently on the back face with the main scale image 71 using a light box or the like, determines scale marks of the both of which indication positions agree with each other in the primary scanning direction, and determines a numerical value (i.e. Num) attached to the determined scale mark.

Thus, the control unit 51 (a) causes the print engine 10a to print all images to be printed (including the main scale image 71 and the vernier scale image 81) so as to move the images to be printed in the primary scanning direction by a sum of the reference deviation amount specified by the reference deviation amount data 43a and a difference between the reference center position of the line sensor 31 and the sheet center actual position (i.e. by the aforementioned dx), and (b) determines a current deviation between the reference center position of the print engine 10a and the reference center position of the line sensor 31 (i.e. (Ps_ref−Pp_ref)) when performing center position adjustment, and renews the reference deviation amount data 43a by adding the determined current deviation to it.

Here, the print engine 10a prints the aforementioned main and vernier scale images on the front and back faces respectively in a manual duplex printing manner, and the control unit 51 causes the operation panel 42 to display a screen to prompt a user to input a numerical value of the scale mark of the main scale image 71 that agrees with the scale mark of the vernier scale image 81, and determines the scale mark of the main scale image 71 that agrees with the scale mark of the vernier scale image on the basis of the numerical value inputted to the screen by the user.

Figure 8A:
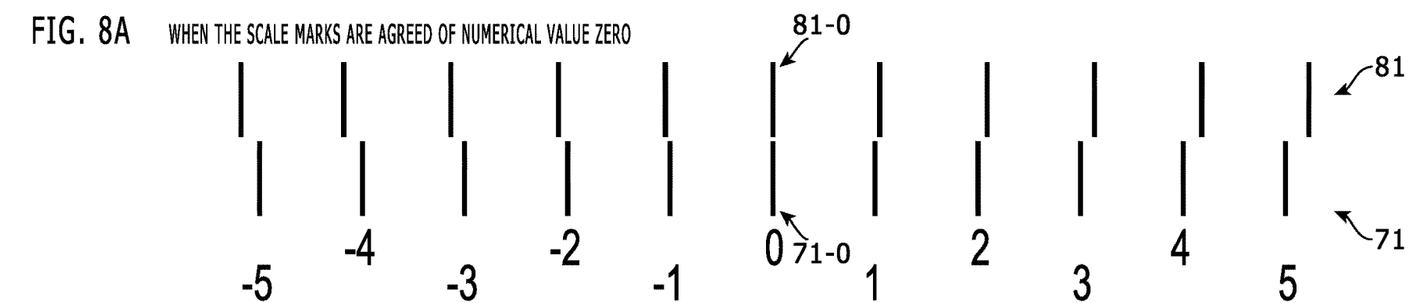
FIGS. 8A, 8B, and 8C show diagrams that explain examples of a scale marks a main scale 71 that agrees with a scale mark of a vernier scale 81.
Figure 8B:
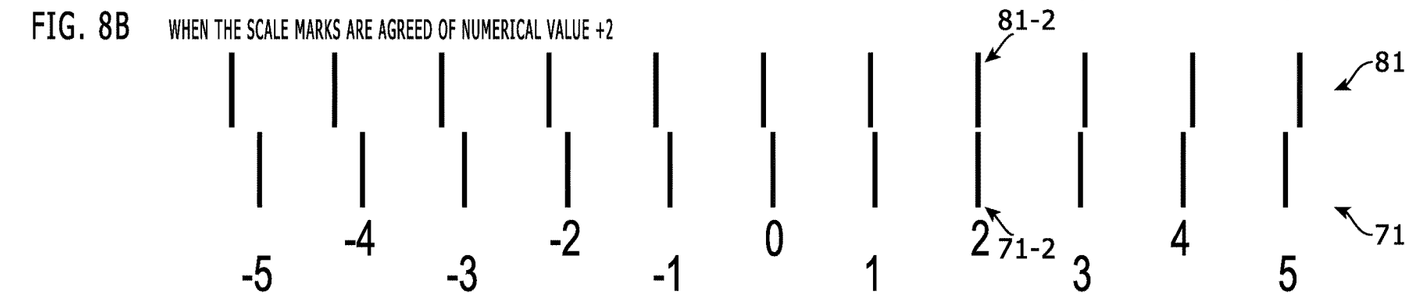
Figure 8C:
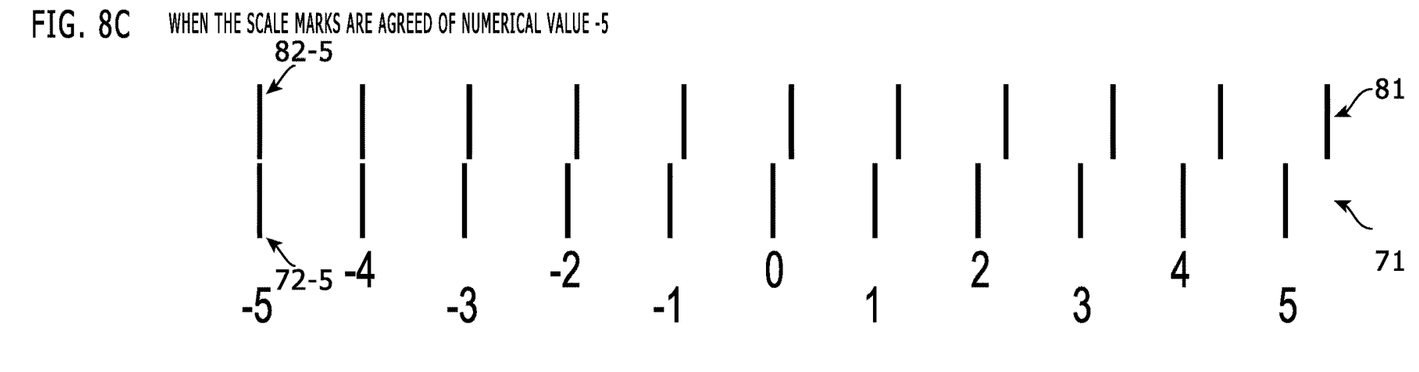

FIGS. 8A, 8B, and 8C show diagrams that explain examples of a scale mark of a main scale 71 that agrees with a scale mark of a vernier scale 81. For example, as shown in FIG. 8A, in the main scale image 71 and the vernier scale image 81, if the scale marks 71-0 and 81-0 indicate positions that agree with each other in the primary scanning direction, then the numerical value "0" attached to this scale mark 71-0 is determined. For example, as shown in FIG. 8B, in the main scale image 71 and the vernier scale image 81, if the scale marks 71-2 and 81-2 indicate positions that agree with each other in the primary scanning direction, then the numerical value "2" attached to this scale mark 71-2 is determined. For example, as shown in FIG. 8C, in the main scale image 71 and the vernier scale image 81, if the scale marks 72-5 and 82-5 indicate positions that agree with each other in the primary scanning direction, then the numerical value "−5" attached to this scale mark 72-5 is determined.

The following part explains a behavior of the aforementioned image forming apparatus.

When detecting a predetermined user operation using the operation panel 42, the control unit 51 performs center position adjustment in the following manner.

Figure 9:
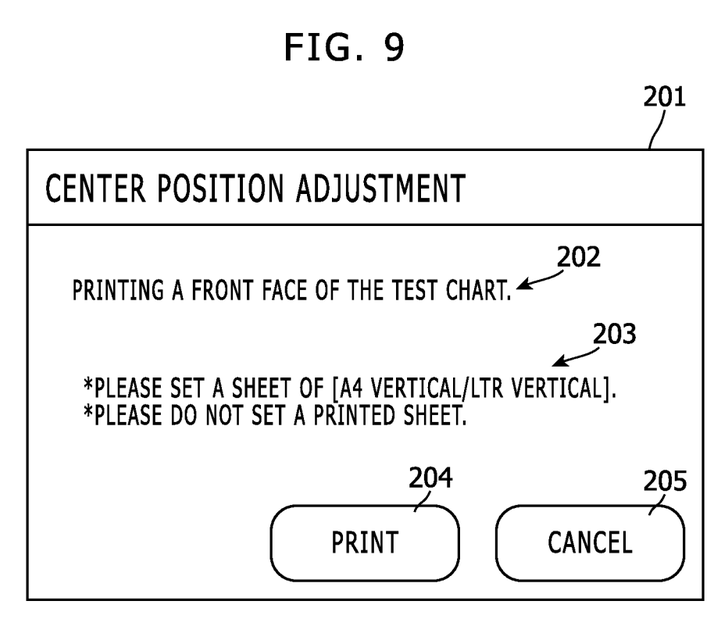
FIG. 9 shows a diagram that indicates an example of a first instruction screen for center position adjustment.

Firstly, the control unit 51 displays on the operation panel 42 a first instruction screen that prompts a user to set a print sheet for the test chart 61.

FIG. 9 shows a diagram that indicates an example of the first instruction screen for center position adjustment. For example, as shown in FIG. 9, the first instruction screen 201 includes a message 202 indicating that printing a front-face image (i.e. the main scale image 71 and the like) of the test chart 61 is performed, a precaution 203 regarding the printing, a print key 204 as a soft key to start printing of the front-face image, and a cancel key 205 as a soft key.

The user sets a print sheet for the test chart 61 on a predetermined sheet feeding tray or the like, and subsequently, performs a predetermined user operation (for example, pressing down the print key 204 in FIG. 9).

Upon detecting this user operation using the operation panel 42, the control unit 51 turns on the aforementioned automatic centering function, and causes the image outputting unit 41 to perform printing the front-face image of the test chart 61. Specifically, in this process, the control unit 51 determines the aforementioned correction amount dx based on the current reference deviation amount data 43a (i.e. the data 43a before this adjustment) and a center position deviation (P1−Ps_ref) of the line sensor 31, and causes the print engine 10a to print the front-face image so as to move the front-face image in the primary scanning direction by the determined correction amount dx.

Figure 10:
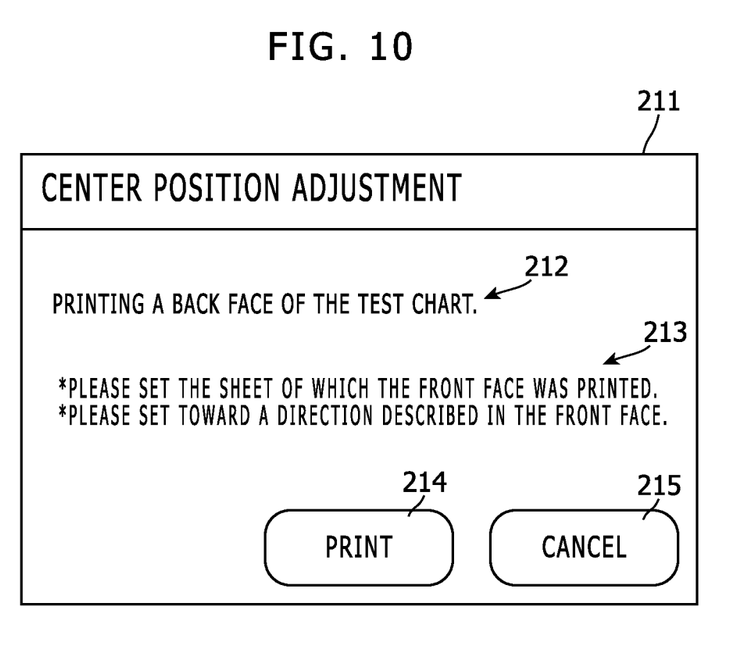
FIG. 10 shows a diagram that indicates an example of a second instruction screen for center position adjustment.

Subsequently, the control unit 51 displays on the operation panel 42 a second instruction screen that prompts a user to set a print sheet for the test chart 61.

FIG. 10 shows a diagram that indicates an example of the second instruction screen for center position adjustment. For example, as shown in FIG. 10, the second instruction screen 211 includes a message 212 indicating that printing a back-face image (i.e. the vernier scale image 81 and the like) of the test chart 61 is performed, a precaution 213 regarding the printing, a print key 214 as a soft key to start printing of the back-face image, and a cancel key 215 as a soft key.

The user sets the print sheet on which the front-face image has been printed, on the predetermined sheet feeding tray or the like toward a direction specified in the front face of the test chart 61 (here, toward a direction that causes a direction of an arrow sign printed on the front face to agree with a sheet feeding direction of the print sheet), and subsequently, performs a predetermined user operation (for example, pressing down the print key 214 in FIG. 10).

Upon detecting this user operation using the operation panel 42, the control unit 51 turns on the aforementioned automatic centering function, and causes the image outputting unit 41 to perform printing the back-face image of the test chart 61. Specifically, in this process, the control unit 51 determines the aforementioned correction amount dx based on the current reference deviation amount data 43a (i.e. the data 43a before this adjustment) and a center position deviation (P1−Ps_ref) of the line sensor 31, and causes the print engine 10a to print the front-face image so as to move the back-face image in the primary scanning direction by the determined correction amount dx.

Figure 11:
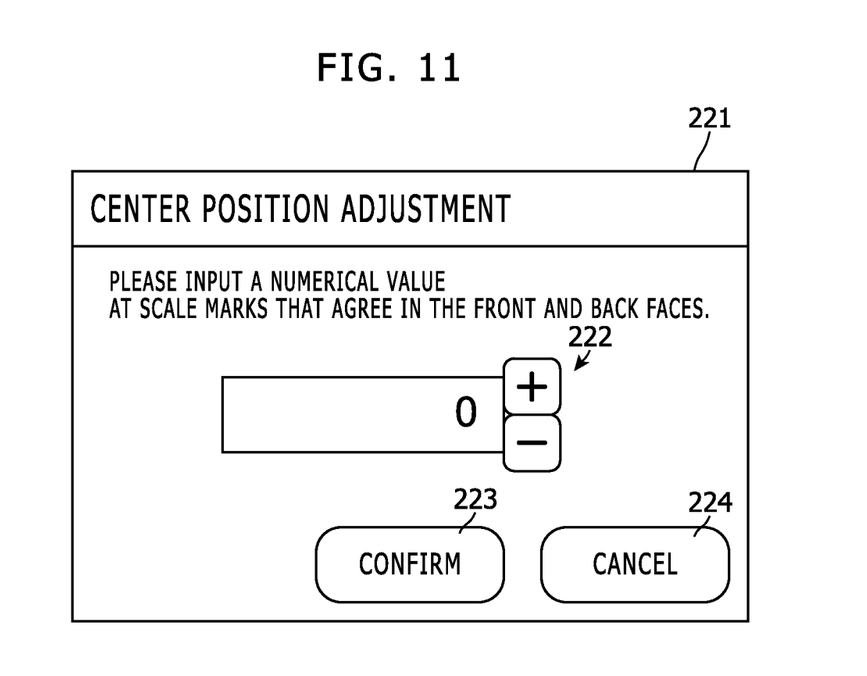
FIG. 11 shows a diagram that indicates an example of an input screen for center position adjustment.

Afterward, the control unit 51 displays on the operation panel 42 an input screen to prompt the user to input a numerical value of the aforementioned scale mark visually read on the test chart 61.

FIG. 11 shows a diagram that indicates an example of the input screen for center position adjustment. For example, as shown in FIG. 11, the input screen 221 includes an input field 222 for input of the aforementioned numerical value of the scale marks of which the indication positions agree with each other, a confirm key 223 to finally determine the inputted numerical value, and a cancel key 224 as a soft key.

The user visually reads the aforementioned numerical value of the scale marks on the test chart 61, and operates the operation panel 42 and thereby inputs this numerical value (e.g. to the input field 222).

Upon detecting the inputted numerical value using the operation panel 42, the control unit 51 detects a current deviation amount based on this numerical value, and renews the reference deviation amount data 43a by adding the detected deviation amount to a current value of the reference deviation amount data 43a.

In the aforementioned manner, the adjustment of the reference deviation amount is performed.

Afterward, the control unit 51 determines the aforementioned correction amount for every print sheet using the adjusted reference deviation amount, and causes the print engine 10a to perform printing on the print sheet so as to move a position of an image to be printed, in the primary scanning direction by the determined correction amount.

As mentioned, in the aforementioned embodiment, the print engine 10a physically prints an image to be printed on a print sheet. The sheet transportation unit 10b transports the print sheet. The line sensor 31 is arranged along a direction perpendicular to a transportation direction of the print sheet, and detects positions of both end edges of the print sheet. The control unit 51 (a) determines as a sheet center actual position a center position of the print sheet on the basis of the positions of both end edges of the print sheet detected by the line sensor 31, and (b) adjusts a center position of an image to be printed, on the basis of a difference from the sheet center actual position. Further, the control unit 51 (a) prints a main scale image along a primary scanning direction on one face among a front face and a back face of a print sheet for a test chart using the print engine 10a, (b) prints a vernier scale image along the primary scanning direction on the other face among the front face and the back face of the print sheet for the test chart using the print engine 10a, (c) determines a deviation between a reference center position of the print engine 10a and a reference center position of the line sensor 31 on the basis of a scale mark of the main scale image that agrees with a scale mark of the vernier scale image, and (d) moves a center position of the image to be printed so as to reduce the determined deviation.

Consequently, restrained are a positional deviation of the print sheet in transportation and the deviation between center positions of the print engine 10a and the line sensor 31, and therefore, with a relatively low cost, the deviation between a center position of the print sheet and a center position of an image printed on the print sheet is effectively reduced.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the print engine 10a is an inkjet-type print engine, and alternatively, the print engine 10a may be another-type print engine such as electrophotographic type.

Further, in the aforementioned embodiment, two sheet feeding cassettes 20-1 and 20-2 are installed, but one or three or more may be installed.

Furthermore, in the aforementioned embodiment, the vernier scale image 81 may be printed on the front face of the test chart 61, and the main scale image 71 may be printed on the back face of the test chart 61.

What is claimed is:

1. An image forming apparatus, comprising:
a print engine configured to physically print an image to be printed on a print sheet;
a sheet transportation unit configured to transport the print sheet;
a line sensor arranged along a direction perpendicular to a transportation direction of the print sheet, and configured to detect positions of both end edges of the print sheet;
a control unit configured to (a) determine as a sheet center actual position a center position of the print sheet on the basis of the detected positions of both end edges of the print sheet, and (b) adjust a center position of the image to be printed on the basis of a difference from the sheet center actual position; and
an operation panel;
wherein the control unit (a) prints a main scale image along a primary scanning direction on one face among a front face and a back face of a print sheet for a test chart using the print engine, (b) prints a vernier scale image along the primary scanning direction on the other face among the front face and the back face of the print sheet for the test chart using the print engine, (c) determines a deviation between a reference center position of the print engine and a reference center position of the line sensor on the basis of a scale mark of the main scale image that agrees with a scale mark of the vernier scale image, and (d) moves a center position of the image to be printed so as to reduce the determined deviation;
wherein the print engine prints the main scale image and the vernier scale image on the front and back faces respectively in a manual duplex printing manner; and
the control unit causes the operation panel to display a screen to prompt a user to input a numerical value of the scale mark of the main scale image that agrees with the scale mark of the vernier scale image, and determines the scale mark of the main scale image that agrees with the scale mark of the vernier scale image on the basis of the numerical value inputted to the screen.

2. The image forming apparatus according to claim 1, further comprising a storage device configured to store reference deviation amount data that indicates a reference deviation amount between the reference center position of the print engine and the reference center position of the line sensor;
wherein the control unit (a) prints images to be printed that includes the main scale image and the vernier scale image using the print engine so as to move the images to be printed in the primary scanning direction by a sum of the reference deviation amount and a difference between the reference center position of the line sensor and the sheet center actual position, (b) determines a current deviation between the reference center position of the print engine and the reference center position of the line sensor, and (c) renews the reference deviation amount data by adding the determined current deviation.

3. An image forming apparatus, comprising:
a print engine configured to physically print an image to be printed on a print sheet;
a sheet transportation unit configured to transport the print sheet;
a line sensor arranged along a direction perpendicular to a transportation direction of the print sheet, and configured to detect positions of both end edges of the print sheet; and
a control unit configured to (a) determine as a sheet center actual position a center position of the print sheet on the basis of the detected positions of both end edges of the print sheet, and (b) adjust a center position of the image to be printed on the basis of a difference from the sheet center actual position;
wherein the control unit (a) prints a main scale image along a primary scanning direction on one face among a front face and a back face of a print sheet for a test chart using the print engine, (b) prints a vernier scale image along the primary scanning direction on the other face among the front face and the back face of the print sheet for the test chart using the print engine, (c) determines a deviation between a reference center position of the print engine and a reference center position of the line sensor on the basis of a scale mark of the main scale image that agrees with a scale mark of the vernier scale image, and (d) moves a center position of the image to be printed so as to reduce the determined deviation;

wherein intervals and the numbers of scale marks of the main scale image and the vernier scale image are set on the basis of a maximum tolerance between the reference center position of the print engine and the reference center position of the line sensor; and a difference between the interval of the scale marks of the main scale image and the interval of the scale marks of the vernier scale image is one pixel.

\* \* \* \* \*